(No Model.)
D. HAZARD.
SAW.
No. 521,343. Patented June 12, 1894.
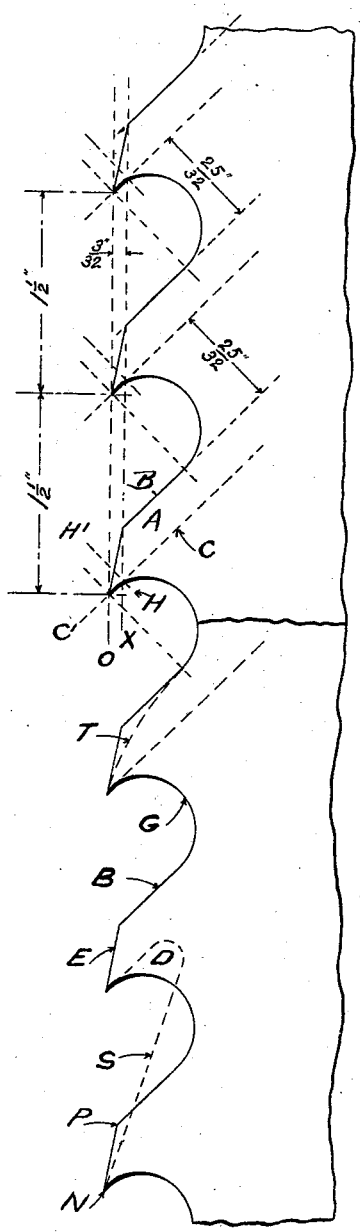
FIG. 1.
FIG. 2.
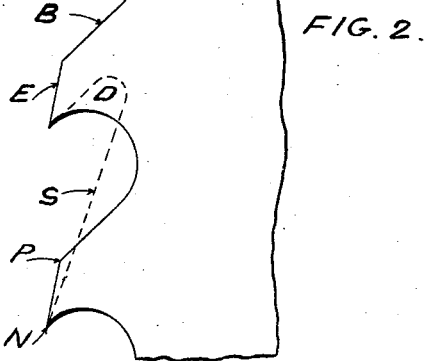
FIG. 3.
WITNESSES:
A. M. Hazard
M. L. Raymond
INVENTOR
Dexter Hazard

UNITED STATES PATENT OFFICE.

DEXTER HAZARD, OF MARQUETTE, MICHIGAN, ASSIGNOR OF ONE-HALF TO FREDERICK O. CLARK, OF SAME PLACE.

SAW.

SPECIFICATION forming part of Letters Patent No. 521,343, dated June 12, 1894.

Application filed January 15, 1894. Serial No. 496,913. (No model.)

*To all whom it may concern:*

Be it known that I, DEXTER HAZARD, of Marquette, in the county of Marquette and State of Michigan, have invented an Improvement in Saws of a type similar to that of my former patent, No. 486,226, dated November 15, 1892, of which the following is a specification.

My invention has for its object: first, the production of saws with teeth so formed as to allow the extreme cutting point to closely resemble in the thickness of its shape, the form of a cutting edge of a knife blade; second, to locate that point in a more direct cutting position, in relation to the line on which the saw travels through the timber, without sacrificing the desired shape and size of the throat, and the strength of the body of the tooth, and number of points in any given space; third, to produce a tooth with the above advantages, which will not draw into the timber when in operation.

I accomplish the above results in the manner hereinafter more specifically shown and described in the drawings and specification.

In the drawings, Figure 1 is a section of a band or gang saw in elevation, showing where the different lines terminate, and where the different portions are located in relation to each other. Fig. 2 is a similar view to Fig. 1 made in order to show the three points where I leave the material necessary to support the cutting point, and the place where I remove the material, in order to increase the cutting capacity, and in order to improve the shape of the throat. Fig. 3 is a cross section of the saw blade, showing the edge of the teeth dressed to a concave.

H shows where the straight face line C terminates in circle line G, and limits the length of the face line C. Line C is a chord of or a straightened portion of semi-circle G, which semi-circle G commences at the cutting point of the tooth on dotted line O, and terminates in tangent B. Said point line C is equal in length to one-third of the radius of the arc G; which arc G is a semi-circle, except as reduced in length by the face line C, as above described. Said face line C and arc G form the face and throat of the tooth, as shown in the drawings. The course of face line C is at forty-five degrees (45°) deflection from dotted line O; and the diameter of said semi-circle G commencing at the extreme cutting point of the tooth and extending to the tangent point of B is at right angles to said face line C; tangent point B being where arcs G and T connect. Dotted line O shows the course of the cutting point of the tooth, as it passes through the timber.

B is a tangential line and one of the lines that form the back of the tooth, and is a continuation of the arc line G at a tangent to said arc G, as well as at a tangent to the arc T. Tangent line B is drawn at an angle of forty-five degrees (45°) of deflection from dotted line O, and terminates at dotted line X, thus locating the course and length of tangent B.

X is a straight dotted line drawn through each tooth at H which is the point of union between the face line C and the arc line G; and said line X is parallel to dotted line O.

E is a straight line which connects tangent B and face line C at the points where B and C terminate on dotted lines O and X respectively, so as to make the cutting point of the tooth. E is not necessarily a true tangent to arc T as is tangent B. The face line C is parallel in its course to the tangent B, and when said tangent B and face line C are united as above stated by line E, they construct the point of the tooth having the desired amount of hook, and the teeth can be dressed so as to preserve the course of face line C and tangent B and maintain their course as parallel lines, as above described.

The arc line T has a radius equal to the distance between the cutting points of the teeth and is a continuation of arc line G, by reversed curve passing through the extreme cutting point of the tooth. Arc G has a radius equal to one-quarter of the distance between the cutting points of the teeth and in connection with face line C makes the face and throat of the tooth, and unites the cutting point of the tooth on line O with tangent B of the arc T.

An advantage gained by the use of the straight face line C is that the teeth are provided with the desired amount of hook, and the saw cannot draw into the timber beyond the point H where face line C terminates in arc G, which is particularly advantageous in the use of large band saws. By making the face line C straight, the extreme point of the tooth can be thrown forward in the direction of the preceding tooth; whereas, if the circle line G continue, it would cut off that fine delicate point. In this respect, this tooth is an improvement over that formed under my Patent No. 486,226. With the use of the tangent B, and the straight line E forming the outer side of the point of the tooth, I can preserve the material that would be removed if the outer side and back were formed on the arc of a circle, as in my Patent No. 486,226, and as indicated by dotted line T. This construction of the tooth gives sufficient amount of material to support the outer side and back of this fine delicate point and at the same time strengthens the entire tooth.

In Fig. 3, it is shown that the teeth are dressed to a concave on their outer face, corresponding to the lines E in the other figures.

Formerly saw teeth have been provided with what are understood as swaged points, which have been dressed on a straight parallel line across the outer line of the point. As these points were below the center in operation, they became round, and caused the saw to cut an irregular kerf. To cover that objection, I have provided these saw teeth with projecting corners, dressed the whole length of the tangent E on a concave line, which leaves these corners prominent above the center. During operation they wear down to a level and thus prevent the above objections.

What I claim is—

1. An improved article of manufacture, a saw blade having its teeth formed integrally therewith, the face and throat of said teeth being formed by semi-circle G, with the end of said semi-circle straightened as a chord of arc G, forming face line C; which face line C is one-third the length of the radius of arc G, and drawn from the located point of the tooth on dotted line O at an angle of forty-five degrees deflection therefrom; in connection with B, which is a continuation of arc line G at a tangent to said arc G, as well as a tangent to the arc T; the diameter of semi-circle G being at right angles to face line C at the extreme point of the tooth; said tangent B terminating in dotted line X at a deflection of forty-five degrees from said line X, and united by line E to face line C forming the cutting point of the tooth; the radius of said arc T being the distance between the cutting points of the teeth, and said arc passing through the extreme cutting point and the tangent point of B, at the place where arcs G and T unite, substantially as shown and described.

2. An improved article of manufacture, a saw blade having its teeth formed integrally therewith, the face and throat of said teeth being formed by semi-circle G, with the end of said semi-circle straightened as a chord of arc G, forming face line C; which face line C is one-third the length of the radius of arc G and drawn from the located point of the tooth on dotted line O at an angle of forty-five degrees deflection therefrom; in connection with B, which is a continuation of arc line G at a tangent to said arc G; as well as at a tangent to the arc T; the diameter of semi-circle G being at right angles to face line C at the extreme point of the tooth; said tangent B terminating in dotted line X at a deflection of forty-five degrees from said line X, and united by line E to face line C forming the cutting point of the tooth; the radius of said arc T being the distance between the cutting points of the teeth, and said arc passing through the extreme cutting point and the tangent point of B at the place where arcs G and T unite; with straight line E dressed on a concave from P to N, with projecting corners at the cutting points, substantially as shown and described.

Dated December 30, 1893.

DEXTER HAZARD.

In presence of—
A. M. HAZARD,
M. L. RAYMOND.